US008554539B2

(12) United States Patent
Kim

(10) Patent No.: US 8,554,539 B2
(45) Date of Patent: Oct. 8, 2013

(54) METHOD FOR ANALYZING MORPHEME USING ADDITIONAL INFORMATION AND MORPHEME ANALYZER FOR EXECUTING THE METHOD

(75) Inventor: Taeil Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 1372 days.

(21) Appl. No.: 11/694,737

(22) Filed: Mar. 30, 2007

(65) Prior Publication Data

US 2007/0233462 A1    Oct. 4, 2007

(30) Foreign Application Priority Data

Mar. 31, 2006  (KR) .................. 10-2006-0029487

(51) Int. Cl.
*G06F 17/27*  (2006.01)
(52) U.S. Cl.
USPC ................ 704/9; 701/1; 701/4; 701/7; 701/8
(58) Field of Classification Search
USPC ...................................................... 704/1–10
See application file for complete search history.

(56) References Cited

U.S. PATENT DOCUMENTS

| | | | | |
|---|---|---|---|---|
| 5,099,425 A * | 3/1992 | Kanno et al. | ...................... | 704/9 |
| 5,101,349 A * | 3/1992 | Tokuume et al. | ................ | 704/9 |
| 5,475,587 A * | 12/1995 | Anick et al. | ...................... | 704/9 |
| 5,619,410 A * | 4/1997 | Emori et al. | ...................... | 704/7 |
| 5,806,021 A * | 9/1998 | Chen et al. | ......................... | 704/9 |
| 6,173,251 B1 * | 1/2001 | Ito et al. | ........................... | 704/7 |
| 6,701,314 B1 * | 3/2004 | Conover et al. | .............. | 707/740 |
| 7,333,927 B2 * | 2/2008 | Lee et al. | .......................... | 704/4 |
| 7,523,102 B2 * | 4/2009 | Bjarnestam et al. | ................. | 1/1 |
| 7,623,648 B1 * | 11/2009 | Oppenheim et al. | ..... | 379/218.01 |
| 2002/0169872 A1 | 11/2002 | Nomiyama | .................. | 709/224 |

* cited by examiner

*Primary Examiner* — Talivaldis Ivars Smits
*Assistant Examiner* — Shaun Roberts
(74) *Attorney, Agent, or Firm* — H.C. Park & Associates, PLC

(57) ABSTRACT

A method of performing a morpheme analysis by utilizing additional information is provided. The method includes acquiring an analysis target phrase and additional information associated with the target phrase. A term is obtained form the additional information. And the phrase is analyzed to extract a key term or keyword by using the term extracted from the additional data.

20 Claims, 8 Drawing Sheets

METHOD FOR ANALYZING MORPHEME USING ADDITIONAL INFORMATION AND MORPHEME ANALYZER FOR EXECUTING THE METHOD

CROSS-REFERENCE TO RELATED APPLICATION

This application claims the benefit of Korean Patent Application No. 10-2006-0029487, filed on Mar. 31, 2006, in the Korean Intellectual Property Office, the disclosure of which is incorporated herein by reference in its entity.

BACKGROUND

1. Field

The present invention relates to a method of performing a morpheme analysis, and particularly, to a phrase analysis for identifying a key term from a phrase.

2. Discussion of Related Technology

The term 'morpheme' indicates a minimal linguistic element constituting a word or a word phrase. The morpheme may be separated into a substantial morpheme and a functional morpheme. The substantial morpheme has a substantial meaning and the functional morpheme is in charge of a functional element. Separating of the morpheme should be completed prior to analyzing of the morpheme to extract an index. Specifically, the morpheme indicates the minimal linguistic element which cannot be separated in an aspect of neither meaning nor function.

Also, a morpheme analysis indicates a process of identifying each of morphemes constituting a word or a word phrase, and restoring each of the morphemes when an irregular utilization, a contraction, or an omission occurs.

A phrase analysis, for example, a morpheme analysis, is required to extract the index. Nouns are generally utilized as indexes and keywords. Various types of function words, other parts of speech, morphologic transformation, and the like are required to extract the nouns. In the case of a search engine, a structure of an index database and a ranking algorithm are most important. However, only when a most appropriate and definitive index is stored, may the search engine have excellent performance. When a Korean text is dissected using only a space, i.e. by a word phrase unit, unsatisfactory search results may be acquired.

Accordingly, in a searching method using a morpheme analysis method, a morpheme analyzer has a deteriorated performance 1) when an unregistered word exists, 2) when spacing of a morpheme analysis target is ignored, or 3) when a single morpheme includes another morpheme. Due to the deteriorated performance, search results may be unsatisfactory and inaccurate.

FIG. 1 illustrates an example of a local information search using an exemplary morpheme analysis method. As shown in FIG. 1, when a keyword GOOKSUHO 101 ("GOOKSUHO" is the name of the Korean people.) is entered into a search webpage 100, the search method using the morpheme analysis method may output a search result 102, which is unassociated with the keyword GOOKSUHO 101 in an aspect of meaning. FIG. 1 shows an example of a problem which may occur since 2) spacing of a morpheme analysis target, for example, DAJEONGOOKSUHOGYEJUM ("DAJEON-GOOKSUHOGYEJUM" includes several Korean words, wherein "DAJEON" is a brand name, "GOOKSU" is a Korean food name which means "noodle", "HOGYE" is the name of the sub-district, and "JUM" is a Korean suffix which means "store".), is ignored and 3) a single morpheme, for example, GOOKSUHO, includes another morpheme, for example, GOOKSU. (In FIG. 1, "GOOKSUHODIDIM-DANCETROUPE" includes several words, wherein "GOOKSUHO" is the name of the Korean people, "DIDIM" is a brand name, and "DANCE" and "TROUPE" are English words.)

The discussion in this section is to provide general background information, and does not constitute an admission of prior art.

SUMMARY

An aspect of the invention provides a method of processing a phrase for a key term thereof, the method comprising: providing a phrase and data associated with the phrase; processing the data to extract a plurality of terms that are incorporated in the data; processing the phrase using the plurality of terms so as to determine whether the phrase incorporates any one of the plurality of terms extracted from the data, wherein processing the phrase determines that the phrase incorporates therein a first one of the plurality of terms; and associating the first term with the phrase as a key term of the phrase.

In the foregoing method, the phrase and the first term may be stored in a searchable database, wherein the first term as the key term is configured to be used to locate the phrase in response to a search query using the first term. The method may further comprise providing a first reference term list comprising a plurality of reference terms, and wherein processing the data may comprise determining whether the data incorporates therein any one of the plurality of reference terms of the first reference term list. The method may further comprise providing a second reference term list comprising a plurality of reference terms, processing the second reference term list so as to determine whether the second reference term list comprises the first term, wherein processing the second reference term list determines that the second reference term list does not comprise the first term, and adding the first term to the second reference term list upon determining that the second reference term list does not comprise the first term. The method may further comprise providing a second reference term list comprising a plurality of reference terms, which comprise the first term, and analyzing the phrase using the second reference term list so as to determine whether the phrase incorporates therein any one of the plurality of reference terms of the second reference term list, wherein analyzing the phrase confirms that the phrase incorporates the first term therein.

Still in the foregoing method, the method may further comprise providing a second reference term list comprising a plurality of reference terms, which comprises a second term, analyzing the phrase using the second reference term list so as to determine whether the phrase incorporates therein any one of the plurality of reference terms of the second reference term list, wherein analyzing the phrase may determine that the phrase incorporates the second term therein, and associating the second term with the phrase as another key term of the phrase. The method may further comprise providing a first reference term list comprising a plurality of reference terms, wherein processing the data comprises determining whether the data incorporates therein any one of the plurality of reference terms of the first reference term list, providing a second reference term list comprising a plurality of reference terms, processing the second reference term list so as to determine whether the second reference term list comprises the first term, wherein processing the second reference term list determines that the second reference term list does not comprise the first term, and adding the first term to the second reference term list upon determining that the second reference term list does not comprise the first term. The method may further comprise providing a reference term list comprising a plurality of reference terms, wherein processing the data comprises determining whether the data incorporates therein any one of the plurality of reference terms of the reference term list, and analyzing the phrase using the reference term list so as to determine whether the phrase incorporates therein any one of the plurality of reference terms of the reference term list, wherein analyzing the phrase determines that the phrase incorporates the first term therein.

Yet in the foregoing method, the first term may comprise two words that are separated by a space therebetween. The first term may be a word is a string of letters without a space between any of two consecutive letters. The phrase may comprise a first word and a second word separated by only a space therebetween, wherein the first term may be a morpheme of the first word. The phrase may comprise a first word and a second word separated only by a space therebetween, wherein the first term may be a portion of the first word and a portion of the second word separated by the space therebetween. The first term may comprise a proper noun. The phrase may be a string of letters without a space between any of two consecutive letters. The phrase may comprise a name of a business. The data may comprise at least one selected from the group consisting of a generic name of a product or service that the business provides, a species of the generic name, a type of the business, and an address of the business.

Further in the foregoing method, the method may further comprise receiving, from a remote terminal, a search request with a search query, analyzing the search query so as to identify at least one key word from the search query, wherein the at least one key word is the first term, searching in a database for information that are associated with the at least one key word comprising the first term, whereby locating the phrase that is associated with the first term, and transmitting, to the remote terminal, data for displaying search results comprising the phrase.

Another aspect of the invention provides a computer program configured to perform the foregoing method.

Still another aspect of the invention provides a system for processing a phrase for a key term thereof, the system comprising: a database comprising a phrase and data associated with the phrase; and a computing device connected to the database, wherein the computing device is configured to process the data to extract a plurality of terms that are incorporated in the data, wherein the computing device is configured to process the phrase using the plurality of terms so as to determine whether the phrase incorporates therein any one of the plurality of terms extracted from the data, and wherein upon determining that a first one of the plurality of terms is incorporated in the phrase, the computing device is configured to associate the first term with the phrase as a key term of the phrase. In the foregoing system, the computing device may be selected from the group consisting of a processor, an interconnected group of processors, a single computer and an interconnected group of computers.

An aspect of the present invention provides a method of performing a morpheme analysis by utilizing additional information.

Another aspect of the present invention also provides a method of performing a morpheme analysis which can utilize a partial character string of additional information, which is stored with a morpheme analysis target, and is generally included in the morpheme analysis target, and thereby can perform a morpheme analysis so that syllables of a vocabulary corresponding to the partial character string may not be separated when the partial character string is included in the morpheme analysis target, and also can improve an accuracy in a searching process using the morpheme analysis method.

Another aspect of the present invention also provides a method of performing a morpheme analysis, which can improve an accuracy and retrieval rate of a local search or a shopping search by utilizing category information or address information as additional information when performing the local search and the shopping search.

Another aspect of the present invention also provides a method of performing a morpheme analysis, which can create a key by analyzing a morpheme of additional information and partially solve an unregistered word problem by utilizing the created key, and supplement a tokenizer using the key when spacing is ignored.

According to an aspect of the present invention, there is provided a method of performing a morpheme analysis, the method including: acquiring a morpheme analysis target and additional information associated with the morpheme analysis target, from search index data; creating a key based on the additional information; and analyzing a morpheme of the morpheme analysis target by using the key.

In this instance, the creating may include: creating a plurality of keys by performing the morpheme analysis for each of information included in the additional information; and creating a combined key by combining the plurality of keys. Also, the additional information may include category information and address information associated with the morpheme analysis target, and the creating of the plurality of keys may include: creating a first key by analyzing a morpheme of the category information; and creating a second key by analyzing a morpheme of the address information. Also, the creating of the combined key may include creating the combined key by combining the first key and the second key, and the analyzing of the morpheme may include analyzing the morpheme of the morpheme analysis target by using the created combined key.

According to another aspect of the present invention, there is provided a morpheme analyzer including: an information acquirement unit configured to acquire a morpheme analysis target and additional information associated with the morpheme analysis target, from search index data; a key creator configured to create a key based on the additional information; and a morpheme analyzing unit configured to analyze a morpheme of the morpheme analysis target by using the key.

BRIEF DESCRIPTION OF THE DRAWINGS

The above and other aspects and advantages of the present invention will become apparent and more readily appreciated from the following detailed description, taken in conjunction with the accompanying drawings of which.

DETAILED DESCRIPTION OF EMBODIMENTS

Figure 1:
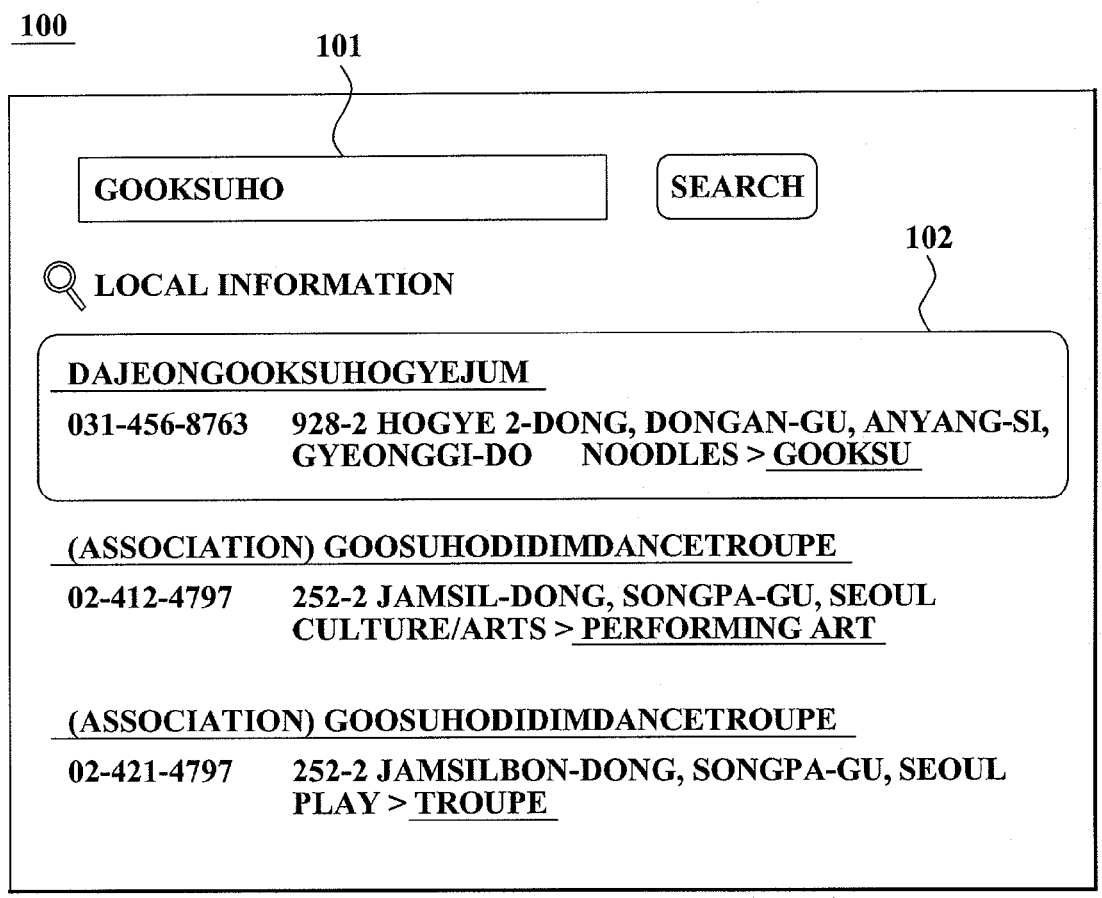
FIG. 1 illustrates an example of local information search using an exemplary morpheme analysis method.

Reference will now be made in detail to exemplary embodiments of the present invention, examples of which are illustrated in the accompanying drawings, wherein like reference numerals refer to the like elements throughout. The exemplary embodiments are described below by referring to the figures.

Figure 2:
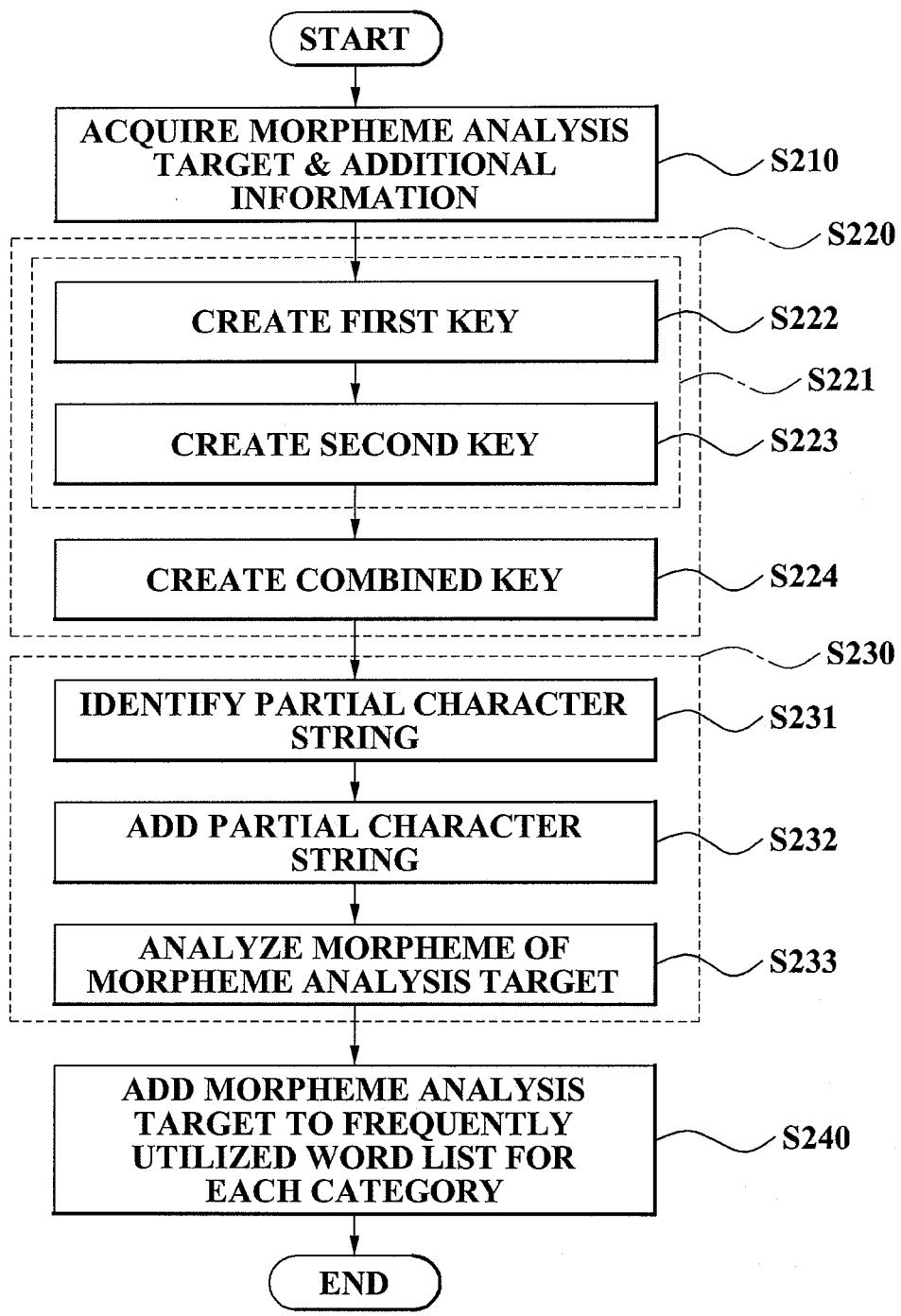
FIG. 2 is a flowchart illustrating a method of performing a morpheme analysis using additional information according to an exemplary embodiment of the present invention.

In certain embodiments, a morpheme analysis will be discussed as an example of the phrase analysis. FIG. 2 is a flowchart illustrating a method of performing a phrase or morpheme analysis using additional or associated information according to an exemplary embodiment of the present invention. In operation S210, a morpheme analyzer using additional information acquires a morpheme analysis target and additional information associated with the morpheme analysis target, from search index data. In this instance, the morpheme analysis target may correspond to a search morpheme analysis target which is outputted from a search engine.

In operation S220, the morpheme analyzer creates a key based on the additional information. In this instance, as shown in FIG. 2, operations S221 and S224 may be included in operation S220, and then performed. Also, the additional information may include category or type of business information and address information associated with the morpheme analysis target. Also, the morpheme analyzer may include a part of a speech tagger which selects only one most probable result from a plurality of morpheme analysis results. In operation S221, the morpheme analyzer creates a plurality of keys by performing the morpheme analysis for each of information included in the additional information. In this instance, as shown in FIG. 2, operations S222 and S223 may be included in operation S221 and performed.

In operation S222, the morpheme analyzer creates a first key by analyzing the morpheme of the category information. In this instance, the category information may be expanded, when the morpheme analysis is performed, by using a keyword information list associated with the category information. In operation S223, the morpheme analyzer creates a second key by analyzing the morpheme of the address information. In operation S224, the morpheme analyzer creates a combined key by combining the plurality of keys. In this instance, the combined key may be created by combining the first key and the second key.

In operation S230, the morpheme analyzer analyzes a morpheme of the morpheme analysis target by using the key. In this instance, as shown in FIG. 2, operations S231 through S233 may be included in operation S230 and then performed. Also, the morpheme analyzer may analyze the morpheme of the morpheme analysis target by using the created combined key. In operation S231, the morpheme analyzer determines whether the morpheme analysis target includes a partial character string corresponding to the key. In operation S232, the morpheme analyzer temporarily adds the partial character string in a morpheme dictionary when the morpheme analysis target includes the partial character string corresponding to the key. As described above, according to an embodiment of the present invention, it is possible to temporarily add a word phrase of the partial character string in the morpheme dictionary without mandatorily separating the word phrase from the partial character string. Accordingly, it is possible to partially solve an unregistered word problem. In operation S233, the morpheme analyzer analyzes the morpheme of the morpheme analysis target by referring to the morpheme dictionary.

In operation S240, the morpheme analyzer adds the morpheme analysis target to a frequently utilized word list for each category, and increases a number of times that a corresponding word is utilized. In this instance, the category information is expanded, when the morpheme analysis is performed, by using information of the frequently utilized word list.

As described above, a morpheme analysis method according to an embodiment of the present invention utilizes a partial character string which is stored with a morpheme analysis target, generally included in the morpheme analysis target, and thereby performs a morpheme analysis so that syllables of a vocabulary corresponding to the partial character string may not be separated when the partial character string is included in the morpheme analysis target. Accordingly, it is possible to improve an accuracy in a searching process using the morpheme analysis method.

Figure 3:
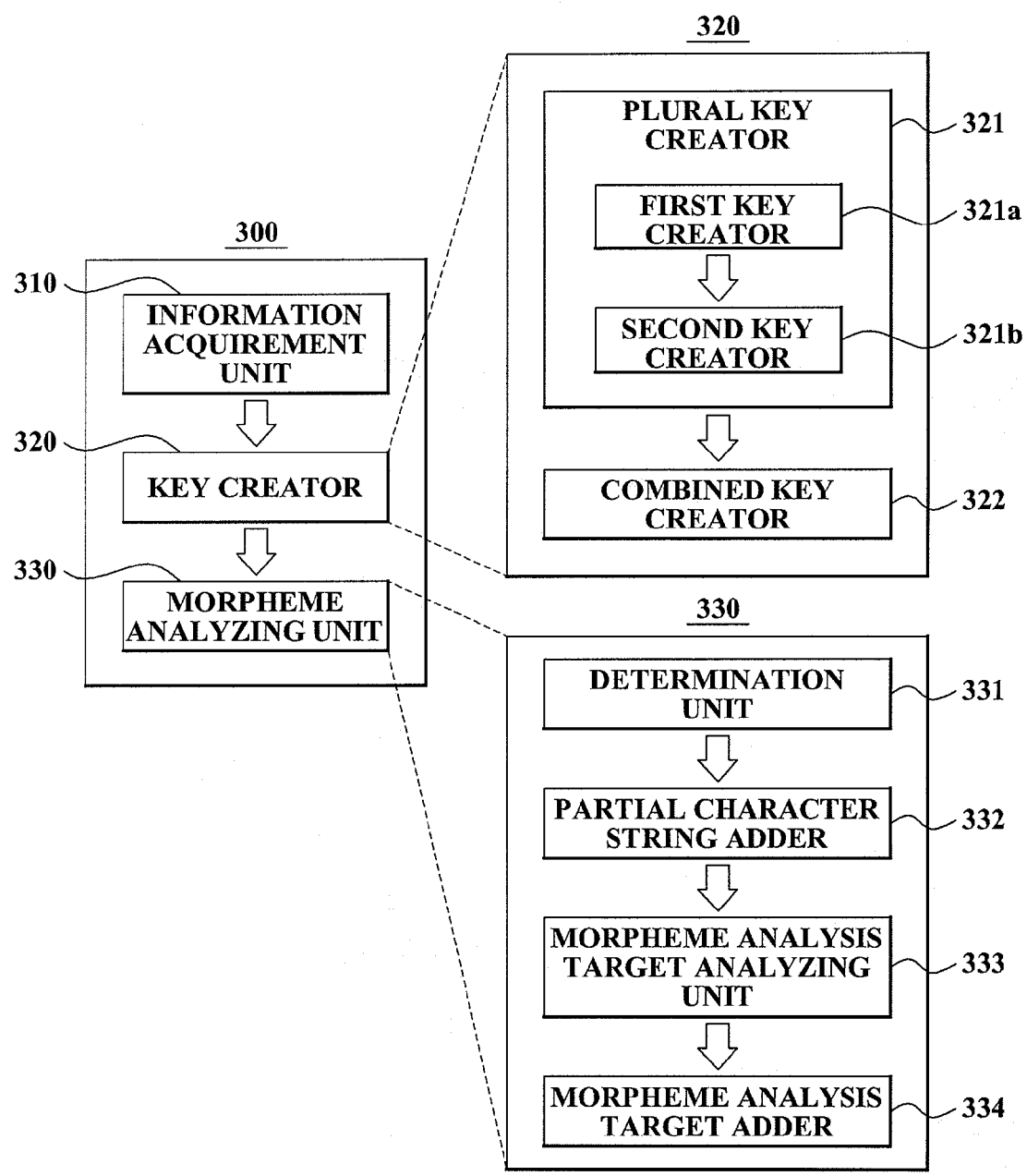
FIG. 3 is a block diagram illustrating an internal configuration of a morpheme analyzer performing a morpheme analysis using additional information according to an exemplary embodiment of the present invention.

FIG. 3 is a block diagram illustrating an internal configuration of a morpheme analyzer 300 performing a morpheme analysis using additional information according to an exemplary embodiment of the present invention. The morpheme analyzer 300 may include an information acquirement unit 310, a key creator 320, and a morpheme analyzing unit 330. The information acquirement unit 310 acquires a morpheme analysis target and additional information associated with the morpheme analysis target, from search index data. In this instance, the morpheme analysis target may correspond to a search morpheme analysis target which is outputted from a search engine.

The key creator 320 creates a key based on the additional information. In this instance, as shown in FIG. 3, the key creator 320 may include a plural key creator 321 and a combined key creator 322. The plural key creator 321 creates a plurality of keys by performing a morpheme analysis for each of information included in the additional information. In this instance, the plural key creator 321 may include a first key creator 321a and a second key creator 321b. The first key creator 321a may create a first key by analyzing a morpheme of the category information. The second key creator 321b may create a second key by analyzing a morpheme of the address information. The combined key creator 322 creates a combined key by combining the plurality of keys. In this instance, the combined key creator 322 may create the combined key by combining the first key and the second key.

The morpheme analyzing unit 330 analyzes a morpheme of the morpheme analysis target by using the key. In this instance, the morpheme analyzing unit 330 may include a determination unit 331, a partial character string adder 332, and a morpheme analysis target analyzing unit 333. Also, the morpheme analyzing unit 330 may analyze the morpheme of the morpheme analysis target by using the created combined key. The determination unit 331 determines whether the morpheme analysis target includes a partial character string corresponding to the key. The partial character string adder 332 temporarily adds the partial character string in a morpheme dictionary when the morpheme analysis target includes the partial character string corresponding to the key. As described above, according to an embodiment of the present invention, it is possible to temporarily add a word phrase of the partial character string in the morpheme dictionary without mandatorily separating the word phrase from the partial character string. Accordingly, it is possible to partially solve an unregistered word problem. The morpheme analysis target analyzing unit 333 analyzes the morpheme of the morpheme analysis target by referring to the morpheme dictionary.

Also, the morpheme analyzing unit 330 may further include a morpheme analysis target adder 334 which adds the morpheme analysis target to a frequently utilized word list for each category, and increases a number of times that a corresponding word is utilized. In this instance, the category information is expanded when the morpheme analysis is performed, by using information of the frequently utilized word list. Specifically, since the morpheme analysis target adder 334 adds the morpheme analysis target to the frequently utilized word list for each category, it is possible to re-utilize the information when the morpheme analyzer 300 performs a subsequent morpheme analysis.

Figure 4:
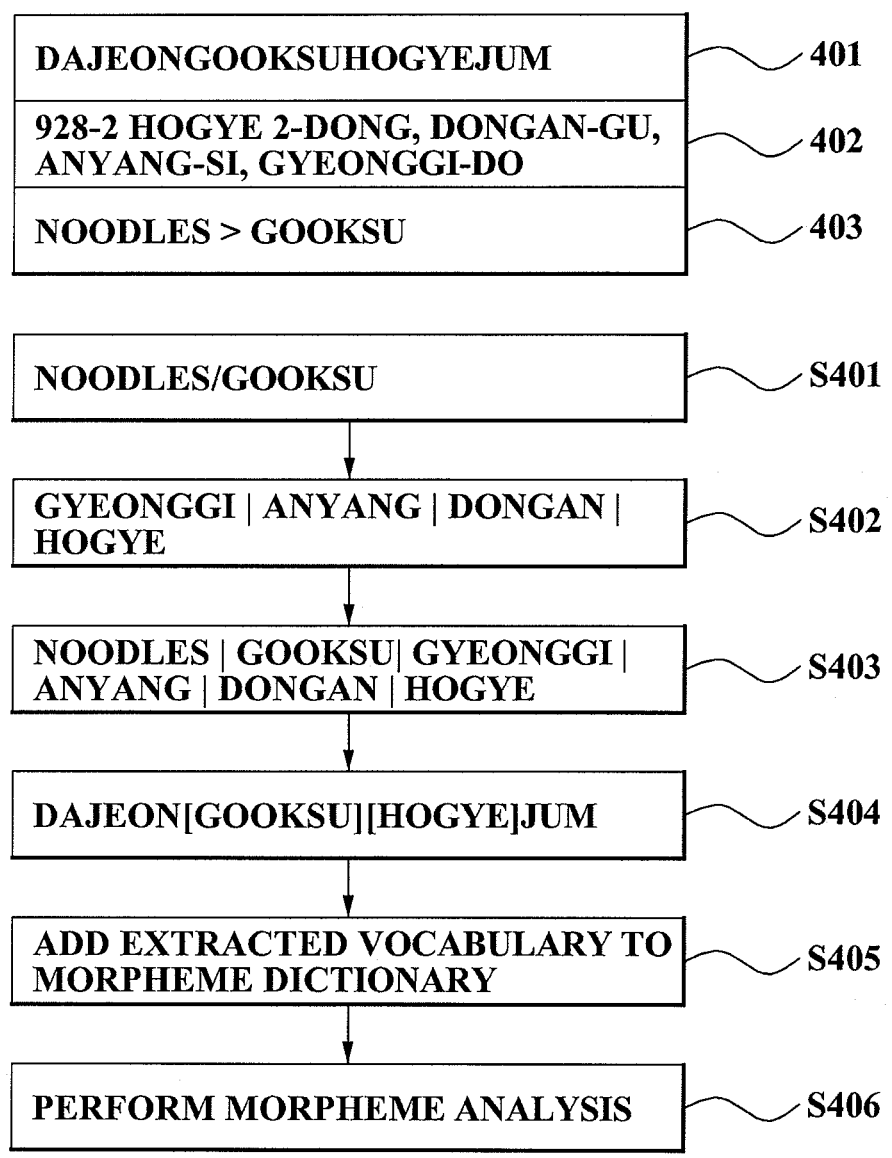
FIG. 4 is a flowchart illustrating a method of performing a morpheme analysis by using a category and an address for local search according to an exemplary embodiment of the present invention.

FIG. 4 is a flowchart illustrating a method of performing a morpheme analysis by using a category and an address for local search according to an exemplary embodiment of the present invention. As shown in FIG. 4, when performing a morpheme analysis in a local search, address information (928-2 HOGYE 2-DONG, DONGAN-GU, ANYANG-SI, GYEONGGI-DO) 402 ("928-2 HOGYE 2-DONG, DONGAN-GU, ANYANG-SI, GYEONGGI-DO" is the address of the business according to Korean address system, wherein "HOGYE" is the name of the sub-district, "DONG" is the suffix which means "sub-district", "DONGAN" is the name of the district, "GU" is the suffix which means "district", "ANYANG" is the name of the city, "SI" is the suffix which means "city", "GYEONGGI" is the name of the province, "DO" is the suffix which means "province".) and category information (noodles>GOOKSU) 403 are utilized. In this instance, the address information 402 and the category information 403 correspond to additional information of a morpheme analysis target (DAJEONGOOKSUHOGYEJUM) 401.

In operation S401, a morpheme analyzer creates a first key or term including noodles and GOOKSU, by analyzing a morpheme of the category information 403. In operation S402, the morpheme analyzer creates a second key including GYOENGGI, ANYANG, DONGAN, and HOGYE, by analyzing a morpheme of the address information 402. In operation S403, the morpheme analyzer creates a combined key, including noodles, GOOKSU, GYOENGGI, ANYANG, DONGAN, and HOGYE, by combining the first key and the second key.

In operation S404, the morpheme analyzer extracts a vocabulary, GOOKSU and HOGYE, including a partial character string of the combined key, from the morpheme analysis target 401. In operation S405, the morpheme analyzer temporarily adds the extracted vocabulary in a morpheme dictionary. In operation S406, the morpheme analyzer performs the morpheme analysis by utilizing the morpheme dictionary including the vocabulary.

As described above, according to an embodiment of the present invention, it is possible to create a key by utilizing the address information 402 and the category information 403, and temporarily add the partial character string of the key, which is included in the morpheme analysis target 401, to the morpheme dictionary so that syllables may not be separated from each other. Through the operation, an accuracy or a retrieval rate of the local search may be improved. Also, it is possible to partially solve an unregistered word problem by utilizing the vocabulary, which is acquired by analyzing the morpheme of the address information 402 and the category information 403. Also, it is possible to supplement a tokenizer using the vocabulary when spacing is ignored.

Figure 5:
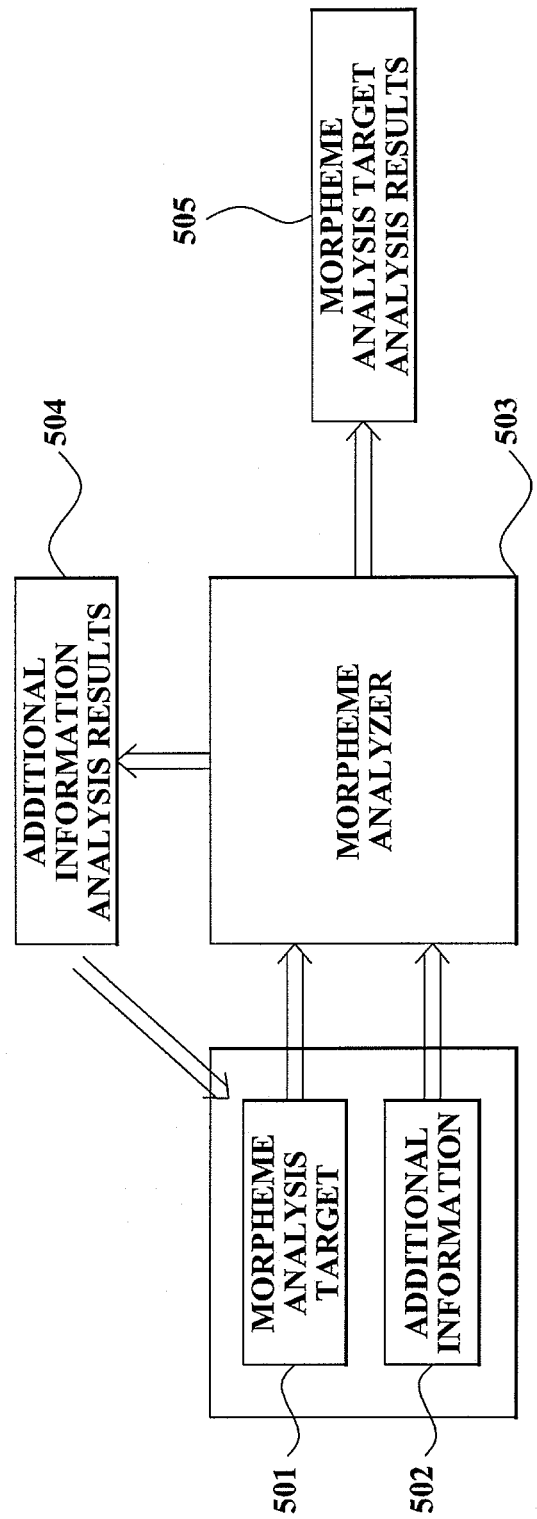
FIG. 5 illustrates a method of performing a morpheme analysis by using additional information according to an exemplary embodiment of the present invention.

FIG. 5 illustrates a method of performing a morpheme analysis by using additional information according to an exemplary embodiment of the present invention. As shown in FIG. 5, additional information analysis results 504 may be acquired by analyzing a morpheme of additional information 502 via a morpheme analyzer 503 prior to analyzing a morpheme of a morpheme analysis target 501. In this instance, the additional information 502 includes category information or address information associated with the morpheme analysis target 501. Also, when the morpheme analysis target 501 includes the additional information analysis results 504 in a form of a partial character string, morpheme analysis target analysis results 505 may be acquired by not separating syllables of the partial character string when analyzing the morpheme of the morpheme analysis target 501. Through the operation, an accuracy in a searching process may be improved.

When any one of 1) an unregistered word exists, 2) spacing of a morpheme analysis target is ignored, and 3) a single morpheme includes another morpheme, a morpheme analysis may be inaccurately performed and thus unsatisfactory search results may be acquired. However, when search results are acquired through the morpheme analysis method using the additional information 502, the above-described problems 1) through 3) may be solved.

Figure 6:
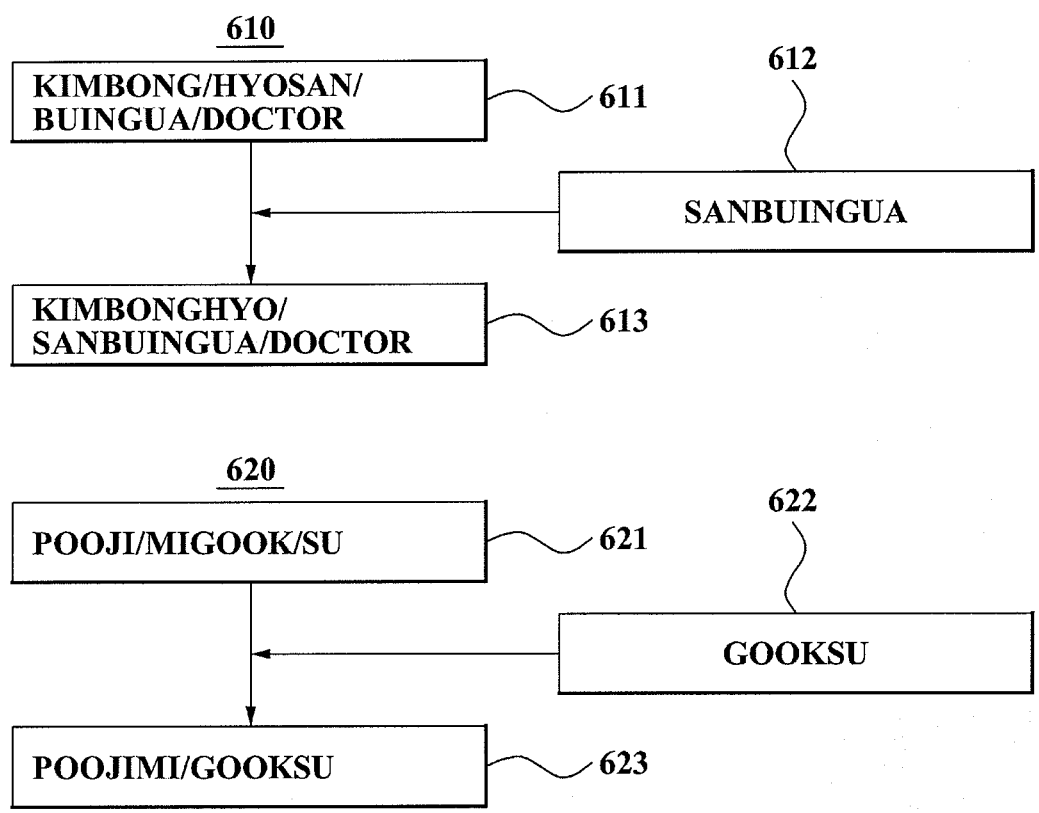
FIG. 6 illustrates a first example and a second example with respect to a performance improvement of morpheme analysis using category information for local search according to an exemplary embodiment of the present invention.

FIG. 6 illustrates a first example 610 and a second example 620 with respect to a performance improvement of morpheme analysis using category information for local search according to an exemplary embodiment of the present invention. The first example 610 shows error analysis results 611 where syllables of 'SANBUINGUA' ("SANBUINGUA" is a Korean word which means "obstetrics and gynecology".), corresponding to a partial character of a morpheme analysis target, are separated, and analysis results 613 where the syllables of the partial character string are not separated by using category information 612. As shown in the first example 610, when performing the local search, search results of a partial character string 'HYOSAN' may include the error analysis results 611 unassociated with the meaning of the morpheme analysis target. To solve the problem, the category information 612 may temporarily add 'SANBUINGUA' in the morpheme dictionary so that syllables of 'SANBUINGUA' may not be separated from each other. Accordingly, the performance of the morpheme analysis may be improved. (In FIG. 6, "KIMBONGHYO" is the name of the doctor.)

The second example 620 shows error analysis results 621 where syllables of 'GOOKSU' corresponding to a partial character string of a morpheme analysis target are separated, and analysis results 623 where the syllables of the partial character string are not separated by using category information 622. As shown in the second example 620, when performing the local search, search results of a partial character string 'MIGOOK' ("MIGOOK" is a Korean word which means the "United States") may include the error analysis results 621 unassociated with the meaning of the morpheme analysis target. To solve the problem, the category information 622 may temporarily add 'GOOKSU' in the morpheme dictionary so that syllables of 'GOOKSU' may not be separated from each other. Accordingly, the performance of the morpheme analysis may be improved. (In FIG. 6, "POOJIMI" is a business name).

Figure 7:
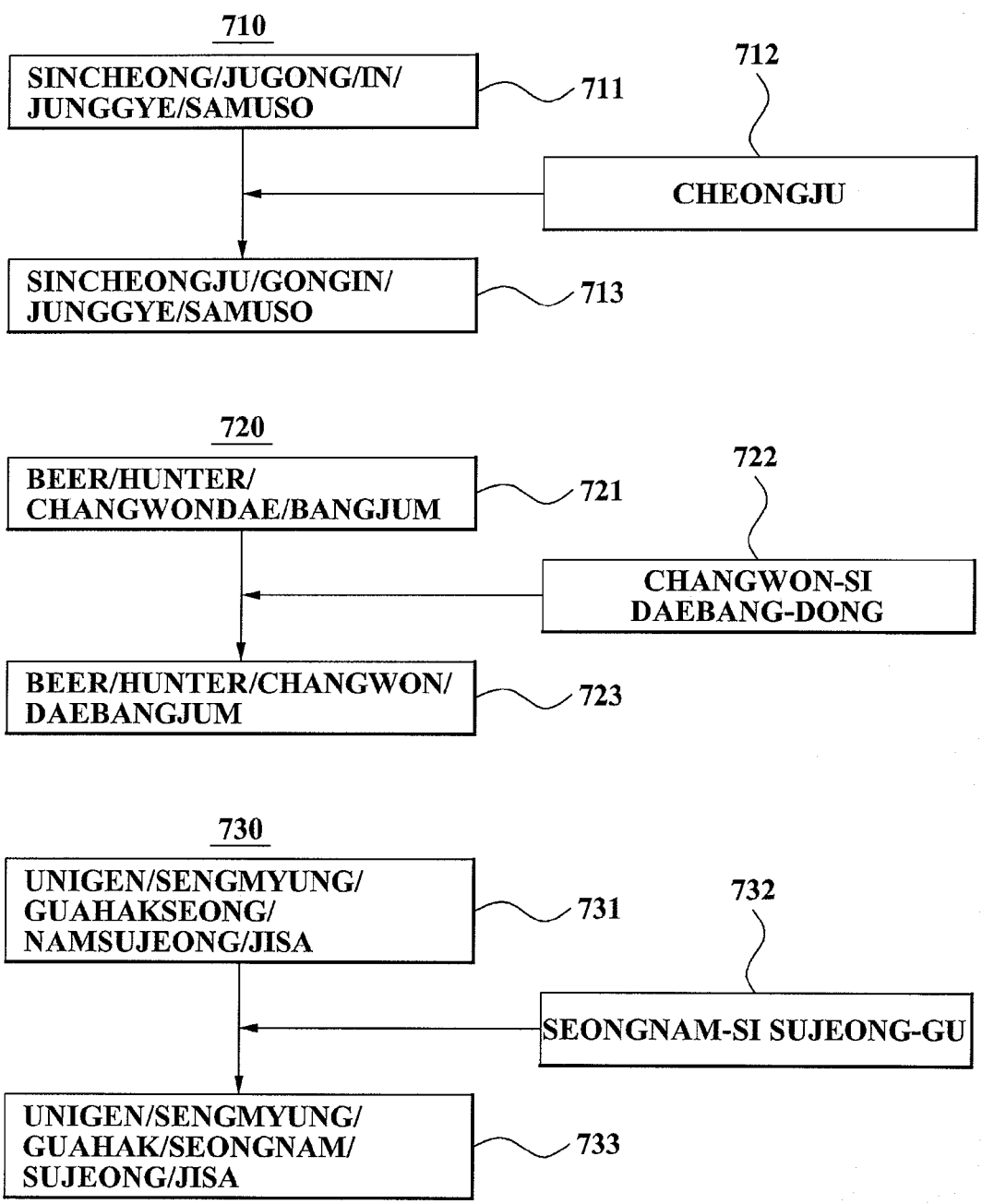
FIG. 7 illustrates first through third examples with respect to a performance improvement of morpheme analysis using address information for local search according to an exemplary embodiment of the present invention.

FIG. 7 illustrates a first example 710, a second example 720, and a third example 730 with respect to a performance improvement of morpheme analysis using address information for a local search according to an exemplary embodiment of the present invention. In the first example 710, accurate analysis results 'SINCHEONGJU/GONGIN/JUNGGYE/SAMUSO' 713 ("CHEONGJU" is the name of the city in Korea, "SIN" is the prefix which means "new", "GONGIN" is a Korean word which means "authorized", "JUNGGYE" is a Korean word which means "brokerage", and "SAMUSO" is a Korean word which means "office".) are extracted by utilizing address information 'CHEONGJU' 712 with respect to error analysis results 'SINCHEONG/JUGONG/IN/JUNGGYE/SAMUSO' 711 ("SINCHEONG" is a Korean word which means "request", "application" or "petition", "JUGONG" is the abbreviation of the name of the Korean company, "IN" may be a meaningless string of letters, "JUNGGYE" is a Korean word which means "brokerage", and "SAMUSO" is a Korean word which means "office".) of a morpheme analysis target 'SINCHEONGJUGONGIN-JUNGGYESAMUSO' which includes several Korean words.

In the second example 720, accurate analysis results 'beer/hunter/CHANGWON/DAEBANGJUM' 723 ("CHANGWON is the name of the city in Korea, "DAEBANG" is the name of the sub-district in CHANGWON, and "JUM" is a Korean suffix which means "store".) are extracted by utilizing address information 'CHANGWON-SI DAEBANG-DONG' 722 ("SI" is the Korean suffix which means "city", and "DONG" is the Korean suffix which means "sub-district") is with respect to error analysis results 'beer/hunter/CHANGWONDAE/BANGJUM' 721 ("CHANGWON-DAE" is the name of the university which includes the name of the city "CHANGWON", and "BANGJUM" is a Korean word which means "marking dot".) of a morpheme analysis target 'beerhunterCHANGWONDAEBANGJUM'.

In the third example 730, accurate analysis results 'UNIGEN/SENGMYUNG/GUAHAK/SEONGNAM/SUJEONG/JISA' 733 ("UNIGEN" is a company name, "SENGMYUNG" is a Korean word which means "life", "GUAHAK" is a Korean word which means "science", "SEONGNAM" is the name of the city in Korea, "SUJEONG" is the name of the district in SEONGNAM, and "JISA" is a Korean word which means "branch".) are extracted by utilizing address information 'SEONGNAM-SI SUJEONG-GU' 732 ("SI" is the Korean suffix which means "city", and "GU" is the Korean suffix which means "district") with respect to error analysis results 'UNIGEN/SENGMYUNG/GUAHAKSEONG/NAMSUJEONG/JISA' 731 with respect to a morpheme analysis target 'UNIGENSENGMYUNGGUAHAKSEONGNAMSUJEONGJISA' which includes several Korean words.

Figure 8:
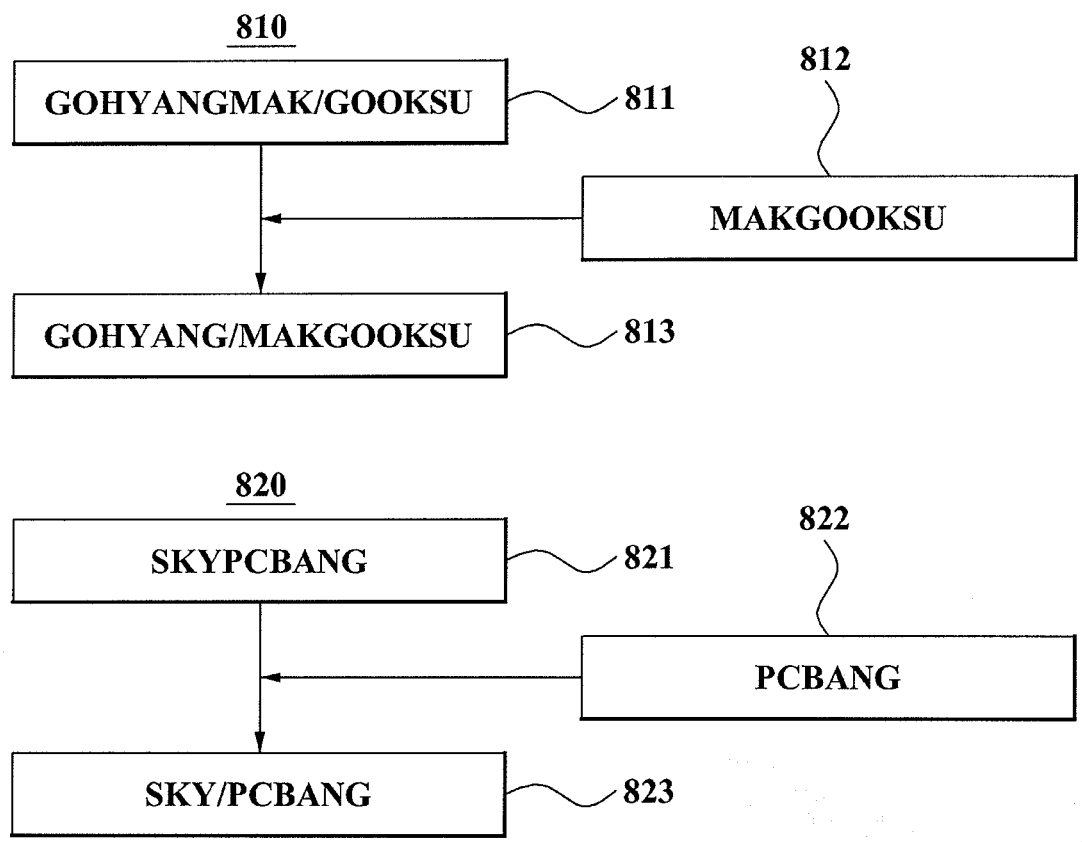
FIG. 8 illustrates a first example of partially solving an unregistered word using additional information and a second example of supplementing a tokenizer according to an exemplary embodiment of the present invention.

As described above, since accurate analysis results are acquired by utilizing address information, an accuracy about results of the local search may be improved. FIG. 8 illustrates a first example 810 of partially solving an unregistered word using additional information and a second example 820 of supplementing a tokenizer according to an exemplary embodiment of the present invention.

In the first example 810, an error analysis problem 'GOHYANGMAK/GOOKSU' 811 of a morpheme analysis target 'GOHYANGMAKGOOKSU' including an unregistered word in a morpheme dictionary is temporarily added in the morpheme dictionary by utilizing category information 'MAKGOOKSU' 812. ("MAKGOOKSU" is a Koran food which is a kind of noodle.) Accordingly, accurate search results 'GOHYANG/MAKGOOKSU' 813 ("GOHYANG" is a Korean word which means "hometown".) may be acquired and thus the unregistered word problem may be partially solved. In the second example 820, accurate analysis results 'sky/pcBANG' 823 are extracted by utilizing category information 'pcBANG' 822 ("BANG" is a Korean suffix which means "store".) with respect to an error analysis problem of a morpheme analysis target 'skypcBANG' 821 where spacing is ignored. Through the operation, the toknizer may be supplemented.

The morpheme analysis method using additional information according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an embodiment of the present invention, there is provided a method of performing a morpheme analysis which can utilize a partial character string of additional information, which is stored with a morpheme analysis target, and is generally included in the morpheme analysis target, and thereby can perform a morpheme analysis so that syllables of a vocabulary corresponding to the partial character string may not be separated when the partial character string is included in the morpheme analysis target, and also can improve an accuracy in a searching process using the morpheme analysis method.

Also, according to an embodiment of the present invention, there is provided a method of performing a morpheme analysis, which can improve an accuracy and retrieval rate of a local search or a shopping search by utilizing category information or address information as additional information when performing the local search and the shopping search. Also, according to an embodiment of the present invention, there is provided a method of performing a morpheme analysis, which can create a key by analyzing a morpheme of additional information and partially solve an unregistered word problem by utilizing the created key, and supplement a tokenizer using the key when spacing is ignored.

In the above, the Korean phrases or words are used for describing embodiments of the invention, although not limited thereto. The phrase analysis according to embodiments of the invention can be used for processing the phrases of any other languages, for example, Japanese, Chinese, English, Thai, Vietnamese, French, German, Italian, Spanish, Thai and Vietnamese.

Although exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of performing a morpheme analysis using a computer, the method comprising:
    acquiring a morpheme analysis target and additional information associated with the morpheme analysis target, from search index data;
    creating, using the computer, a key based on the additional information in response to acquiring the additional information; and
    analyzing, via the computer, a morpheme of the morpheme analysis target by using the key,
    wherein creating the key comprises:
        creating a plurality of keys by performing the morpheme analysis for each information included in the additional information; and
        creating a combined key by combining the plurality of keys, and
    wherein analyzing the morpheme comprises:
        determining whether the morpheme analysis target includes a partial character string corresponding to the key; and
        temporarily adding the partial character string in a morpheme dictionary when the morpheme analysis target includes the partial character string corresponding to the key.

2. The method of claim 1, wherein the additional information comprises category information and address information associated with the morpheme analysis target.

3. The method of claim 2, wherein creating the plurality of keys comprises:
    creating a first key by analyzing a morpheme of the category information; and
    creating a second key by analyzing a morpheme of the address information.

4. The method of claim 3, wherein creating the combined key comprises creating the combined key by combining the first key and the second key, and
    wherein analyzing the morpheme comprises analyzing the morpheme of the morpheme analysis target by using the created combined key.

5. The method of claim 3, wherein the category information is expanded by using a keyword information list associated with the category information in response to the morpheme analysis being performed.

6. The method of claim 1, wherein analyzing the morpheme further comprises:
    analyzing the morpheme of the morpheme analysis target by referring to the morpheme dictionary.

7. The method of claim 6, further comprising:
    adding the morpheme analysis target to a frequently utilized word list for each category, and increasing a number of times that a corresponding word is utilized,
    wherein the category information is expanded by using information of the frequently utilized word list in response to the morpheme analysis being performed.

8. The method of claim 1, wherein the morpheme analysis target corresponds to a search morpheme analysis target provided by a search engine.

9. The method of claim 1, wherein the morpheme analysis target comprises the key.

10. The method of claim 1, wherein the key is not separated into a plurality of portions in analyzing the morpheme.

11. A non-transitory computer-readable recording medium storing a program for implementing the method of claim 1.

12. A morpheme analyzer, comprising:
    an information acquirement unit configured to acquire a morpheme analysis target and additional information associated with the morpheme analysis target, from search index data;
    a key creator configured to create a key based on the additional information in response to the information acquirement unit acquiring the additional information; and
    a morpheme analyzing unit configured to analyze a morpheme of the morpheme analysis target by using the key,
    wherein the key creator comprises:
        a plural key creator configured to create a plurality of keys by performing a morpheme analysis for each information included in the additional information; and
        a combined key creator configured to create a combined key by combining the plurality of keys, and
    wherein the morpheme analyzing unit comprises:
        a determination unit configured to determine whether the morpheme analysis target includes a partial character string corresponding to the key; and
        a partial character string adder configured to temporarily add the partial character string in a morpheme dictionary in response to determining that the morpheme analysis target includes the partial character string corresponding to the key.

13. The morpheme analyzer of claim 12, wherein the additional information comprises category information and address information associated with the morpheme analysis target.

14. The morpheme analyzer of claim 13, wherein the plural key creator comprises:
    a first key creator configured to create a first key by analyzing a morpheme of the category information; and
    a second key creator configured to create a second key by analyzing a morpheme of the address information.

15. The morpheme analyzer of claim 12, wherein the combined key creator creates the combined key by combining the first key and the second key, and the morpheme analyzing unit analyzes the morpheme of the morpheme analysis target by using the created combined key.

16. The morpheme analyzer of claim 12, wherein the morpheme analyzing unit further comprises:
    a morpheme analysis target analyzing unit configured to analyze the morpheme of the morpheme analysis target by referring to the morpheme dictionary.

17. The morpheme analyzer of claim 16, wherein the morpheme analyzing unit further comprises:
    a morpheme analysis target adder configured to add the morpheme analysis target to a frequently utilized word list for each category, and increase a number of times that a corresponding word is utilized,
    wherein the category information is expanded by using information of the frequently utilized word list in response to the morpheme analysis being performed.

18. The morpheme analyzer of claim 17, wherein the morpheme analysis target comprises the key in a first configuration and a second configuration, wherein in the first configuration, the key is not separated, and in the second configuration, at least two portions of the key are separated from each other.

19. The morpheme analyzer of claim 12, wherein the morpheme analysis target comprises the key.

20. The morpheme analyzer of claim 12, wherein the key is not separated into a plurality of portions in analyzing the morpheme.

\* \* \* \* \*